UNITED STATES PATENT OFFICE 2,378,585

SAFETY PAPER

Adolf Schroth, Neu-Kaliss, Germany; vested in the Alien Property Custodian

No Drawing. Application December 15, 1937, Serial No. 180,047. In Germany December 23, 1936

6 Claims. (Cl. 92—21)

This invention relates to a process for the manufacture of safety paper.

So-called safety paper is used for documents of various kinds, for example cheques, for preventing falsification especially with the aid of chemical agents. It is necessary for such paper to give a distinctly visible reaction with acids, alkalis, oxidising agents and reducing agents. Consequently a number of different reagents must be added to the paper. This gives rise to difficulties when the reagents also react upon one another, so that the discolouration which is intended to indicate the falsification occurs prematurely. It is obvious that a safety paper of this nature would be useless.

Such difficulties can occur for example if the attempt be made simultaneously to incorporate in the paper a reagent which reacts with reducing agents and a reagent which reacts with acids, because reagents which are effective for indicating falsification effected with the use of reducing agents must be very sensitive, since forgers only use very mild reducing agents in order not to damage the paper itself.

Now the present invention relates more especially to a process which enables reagents which are sufficiently sensitive to reducing agents and reagents which are sensitive to acids to be added simultaneously to the paper pulp.

Known indicators for acids are certain metallic salts, for example ferrocyanide compounds such as manganese ferrocyanide, copper ferrocyanide, or cobalt ferrocyanide, which may be used either alone or in combination with iron salts. These compounds also give a reaction with oxidizing agents. If an attempt be made to add these substances to a paper which contains, as the reagent sensitive to reducing agents, an inorganic salt for example which can be easily reduced to the metal, the later reaction with a reducing agent becomes impossible because the aforesaid salts and cyanides act on the inorganic salt and effect reduction prematurely.

The undesired reducing action of the acid indicators is due to the fact that directly after they are introduced into the hollander they split off sufficient ions to effect reduction. The ion formation in the hollander as well as on the drying apparatus of the paper machine, where definite thermo-electrical processes take place, is promoted by the acidity of the pulp due to its content of alum which is necessary for sizing. Owing to this ion formation, the inorganic salt which acts as the indicator for reducing agents, has its metal separated either in the hollander or at the latest in the paper machine and premature discolouration of the material therefore occurs. Although, when the paper pulp has a neutral reaction, the formation of ions is only small, nevertheless the solubility product is still so great that the ions which are split off have sufficient reducing power. It must also be mentioned that the substances, for example the said ferrocyanide compounds, which are employed as indicators for acid are often contaminated by ionizable salts, for example iron salts, so that the number of free cations is thereby increased.

Also when the paper is stored discolouration can occur subsequently, since owing to the catalytic action of light and moisture decomposition and ion formation may occur in consequence of photolysis.

The aforesaid disadvantages are obviated by the process according to the present invention. The process of invention enables suitable metal compounds, for example ferrocyanides which themselves have a strong reducing power, to be incorporated in the paper pulp as acid indicators together with easily reducible substances, for example easily reducible inorganic salts, without reduction of the inorganic salt being effected and discolouration of the paper being caused owing to separation of the metal.

In accordance with the invention, the metal compounds, for example ferrocyanides which act as the acid indicators, are converted before or during their addition to the paper pulp or to the paper into only slightly dissociated, and in particular colourless or only slightly coloured complex salts of the metals of the sixth group of the periodic system which form acids or polyacids, for example into ferric tungstate, ammonium-ferrous-cyanogen-tungstate or ammonium-ferrous-cyanogen-molybdate, or are mixed with buffering agents for example alkali metal salts of phosphoric or boric acid, which immediately take up ions occurring in the nascent state for example iron ions, and transform them into undissociated compounds.

It is known simultaneously to incorporate in safety papers indicators for both acids and oxidising agents, for example an insoluble ferric salt and potassium ferrocyanide as the acid indicator and manganese sulphate as the indicator for oxidising agents. In this case, however, the two different reagents do not react upon one another in the paper pulp. There is no question in this case of preventing any mutual reaction between the various reagents in the paper pulp or in the paper, though it was important in the known process provisionally to separate the components of the acid reaction one from the other and to fix the corresponding metal precipitates on the fibres which was effected by means of resin compounds of the metal salts. This has nothing whatever to do with the present invention.

It is also known to effect a kind of buffering in order to protect the safety paper from external and atmospheric influences, for example by regulating the pH value of the finished paper to a definite value, so that the occurrence of the discolouration which indicates the falsification can be determined. Finally an attempt has been made to prevent falsification by incorporating ink fixatives in the safety paper. In this case the ink fixative can again be protected by a stabilising agent. None of the known proposals however has been concerned in any way with enabling indicators for acids and for reducing agents to be incorporated simultaneously.

According to the first of the aforesaid methods of the invention, the ferrocyanide molecule is transformed into a colourless or only slightly coloured complex salt of a metal selected from a group consisting of tungsten and molybdenum. In these complex salts the ferrocyanide is firmly joined to the central atom by a principal valency bond or by a residual valency bond. The complex salts are of surprising stability owing to their high molecular composition and are characterised by a very low power of dissociation. Further, if any slight dissociation should occur, the ferrocyanide occurs for the most part not as free ions but as complex ions, and no free ions having sufficient power prematurely to reduce the inorganic salt to the metal and thereby produce discolouration, are therefore formed.

When paper which contains the ferrocyanide in the form of these complex compounds is treated with acids, the complex compounds are frequently decomposed into the simple salts which possess a greater power of dissociation.

It frequently happens, however, that low molecular, highly coloured complex salts are formed by the action of acids on the colourless or only slightly coloured high molecular salts whereby a discolouration of the paper is produced.

A second method may be employed wherein an alkali salt, as for instance of phosphoric or boric acid, is added to the ferrocyanide. As I have said before, ferrocyanide compounds are very often contaminated by ionizable iron. The iron ions forming in statu nascendi from these impurities are at once absorbed by these salts acting as stabilizing or buffer substances and are transformed to insoluble iron phosphate or iron borate compounds, the solubility product being so slight that a sufficient number of free ions cannot be formed to reduce the inorganic salt to metal.

In order that my invention be more clearly understood the following examples are offered for the purpose of illustration and not by way of limitation.

*Example 1.*—To the paper pulp in the hollander which contains an inorganic salt which is capable of being reduced to elemental form, for example mercury tungstate or barium tellurite or barium selenite, precipitated colloidal iron tungstate is added and the paper is impregnated with a solution of complex ammonium-iron-cyan-tungstate. The iron tungstate and ammonium iron-cyan-tungstate act in conjunction in the finished paper as an indicator for detecting acids.

The mechanism of the reaction of the acid treatment is very complicated since it is carried on not between simple molecular compounds but on the contrary, between complex compounds of high valence. In addition there also occurs a double reaction. In the primary reaction a blue to brown color fleck is formed and in the secondary reaction a complex iron-cyanogen tungstate of strong red-brown color is formed from the slightly yellow ammonium iron cyanogen tungstate. The reactions are as follows:

(a)

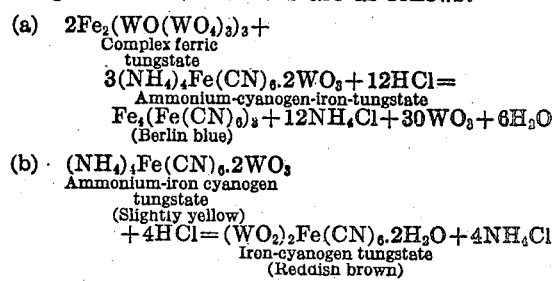

(b)

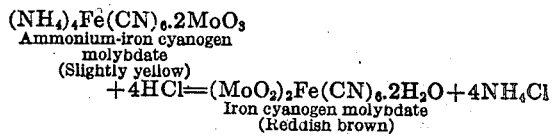

*Example 2.*—The paper pulp which contains an inorganic salt which is capable of being reduced to elemental form is impregnated with a solution of ammonium iron-cyan-molybdate (see Chemische Zentral-Blatt, 1929, Band 2, Page 2765), which acts as the indicator for detecting acids.

In this example, during the acid treatment, a strongly colored complex salt is formed from the uncolored one, as in example 1b:

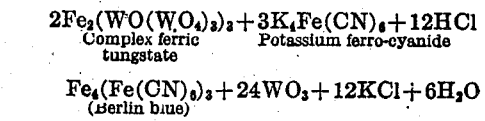

*Example 3.*—To the paper pulp in the hollander which contains an inorganic salt which is capable of being reduced to elemental form there is added precipitated colloidal iron tungstate and the paper is impregnated with a solution of potassium ferrocyanide which contains an alkali metal salt of phosphoric acid or boric acid as a buffering agent.

During the acid treatment, a blue reaction speck is formed consisting of Berlin blue:

$$2Fe_2(WO(W O_4)_3)_3 + 3K_4Fe(CN)_6 + 12HCl$$
$$\text{Complex ferric tungstate} \quad \text{Potassium ferro-cyanide}$$
$$Fe_4(Fe(CN)_6)_3 + 24WO_3 + 12KCl + 6H_2O$$
$$\text{(Berlin blue)}$$

The paper pulp can also be impregnated solely with alkali potassium-ferrocyanide solution to which an alkali metal salt of phosphoric acid or boric acid is added as a stabilizer. The ammonium iron cyanogen molybdate compound was formed directly in the same manner as described in the Chemische Zentral-Blatt mentioned above.

I claim:

1. A safety paper containing an easily reducible inorganic salt selected from a group consisting of mercury tungstate, barium tellurite and barium selenite as an indicator for reducing agents and ammonium-iron-cyan-molybdate.

2. A safety paper containing an easily reducible inorganic salt selected from a group consisting of mercury tungstate, barium tellurite and barium selenite as an indicator for reducing agents, iron tungstate and ammonium-iron-cyan-tungstate.

3. A safety paper which contains a reducible salt selected from the group consisting of mercury tungstate, barium tellurite and barium selenite, and a compound selected from the group consisting of ammonium-iron-cyan-tungstate and ammonium-iron-cyan-molybdate.

4. A safety paper which contains a reducible salt selected from the group consisting of mercury tungstate, barium selenite and barium tellurite; ferric tungstate and a compound selected from the group consisting of ammonium-iron-cyan-tungstate and ammonium-iron-cyan-molybdate.

5. A safety paper which contains a reducible salt selected from the group consisting of mercury tungstate, barium tellurite and barium selenite; ferric tungstate and ammonium-iron-cyan-tungstate.

6. A safety paper which contains a reducible salt selected from the group consisting of mercury tungstate, barium tellurite and barium selenite; ferric tungstate and ammonium-iron-cyan-molybdate.

ADOLF SCHROTH.